United States Patent [19]
Martin

[11] 3,918,933
[45] Nov. 11, 1975

[54] NICKEL-LANTHANUM ALLOY PRODUCED BY A REDUCTION-DIFFUSION PROCESS

[75] Inventor: Donald L. Martin, Elnora, N.Y.

[73] Assignee: General Electric Company, Schenectady, N.Y.

[22] Filed: July 24, 1974

[21] Appl. No.: 491,473

Related U.S. Application Data

[63] Continuation of Ser. No. 345,559, March 28, 1973, abandoned.

[52] U.S. Cl. .................... 55/16; 75/.5 BA; 75/170; 148/101
[51] Int. Cl.² ................ B01D 53/16; C22C 1/05; C22C 19/08
[58] Field of Search ........ 75/.5 R, .5 RA, .5 B, 170, 75/152; 148/101; 252/181.6; 316/25; 55/16; 206/.7

[56] References Cited
UNITED STATES PATENTS 3,625,779  12/1971  Cech ........................ 148/101
3,748,193  7/1973   Cech ........................ 148/101
3,793,435  2/1974   Reilly ....................... 252/181.6
3,825,418  7/1974   Reilly ....................... 75/170
3,826,696  7/1974   Cech ........................ 148/31.57

OTHER PUBLICATIONS

"Rare Metal Metallurgy," Kroll–Metal Industry 10-1-48, pp. 263-265.

Primary Examiner—L. Dewayne Rutledge
Assistant Examiner—Arthur J. Steiner
Attorney, Agent, or Firm—Jane M. Binkowski; Joseph T. Cohen; Jerome C. Squillaro

[57] ABSTRACT

A reduction-diffusion process for producing particles of a nickel-lanthanum alloy suitable for the selective absorption and storage of hydrogen by heating a particulate mixture of lanthanum oxide, nickel and calcium hydride to effect reduction of the lanthanum oxide and to diffuse the resulting lanthanum into the nickel particles to form the intermetallic compound.

1 Claim, No Drawings

NICKEL-LANTHANUM ALLOY PRODUCED BY A REDUCTION-DIFFUSION PROCESS

This is a continuation of application Ser. No. 345,559, filed Mar. 28, 1973, now abandoned.

The present invention relates to the production of particles of nickel-lanthanum alloy suitable for the selective absorption and storage of hydrogen produced by a reduction-diffusion process.

The $Ni_5La$ single phase intermetallic compound selectively absorbs hydrogen gas in amounts significantly greater than other materials. It is particularly useful as a storage medium for hydrogen since it does not require the costly precautionary measures ordinarily associated with hydrogen storage. In addition, it can be desorbed in a practical manner to yield hydrogen.

However, the use of the $Ni_5La$ compound has been limited because methods of preparing it are lengthy, timeconsuming and costly. One conventional process comprises reduction of lanthanum fluoride with calcium to form a product of calcium fluoride and lanthanum which is vacuum melted to slag off the calcium fluoride and distill off any unreacted calcium. Lanthanum is then recovered, and remelted with nickel in proper amount, cast into an ingot and ground to particles having a size which provides sufficient surface area for the effective absorption of hydrogen.

It is an object of the present invention to produce particles of a nickel-lanthanum alloy suitable for absorption and storage of hydrogen by a reduction-diffusion process which avoids the time-consuming, costly steps of conventional processes.

In copending U.S. Pat. application, Ser. No. 172,290 filed Aug. 16, 1971 in the name of Robert E. Cech and assigned to the assignee hereof, there is disclosed and claimed a process for preparing a magnetic material comprised of a particulate rare earth intermetallic compound. The process includes providing a particulate mixture of rare earth metal oxide, calcium hydride and a metal such as cobalt or iron, or alloys or mixtures thereof which can also include manganese, or alloys, or mixtures of either cobalt or iron with manganese; heating the particulate mixture in a non-reactive atmosphere to decompose the calcium hydride and thereby effect reduction of the rare earth metal constituent; and then heating the resulting mixture to diffuse the resulting rare earth metal into the aforementioned metal to form the rare earth intermetallic compound which is then recovered from the mixture.

In the present process, nickel-lanthanum alloy particles suitable for the selective absorption and storage of hydrogen are prepared directly from lanthanum oxide and nickel powder. This process eliminates the necessity of the separate steps of past processes of forming the lanthanum bulk metal product. In addition, such steps as melting lanthanum with nickel, casting the melt into an ingot and grinding the ingot to particle size are also eliminated.

Briefly stated, the present invention is a process for preparing a material useful for selectively absorbing and storing hydrogen comprised of particles substantially free of strain consisting essentially of nickel-lanthanum alloy having a composition within 15% by weight of the $Ni_5La$ stoichiometric composition. Such an alloy contains a substantial amount of the $Ni_5La$ single phase intermetallic compound. The process comprises providing a particulate mixture of lanthanum oxide, calcium hydride and nickel and heating the particulate mixture in a non-reactive atmosphere to decompose the calcium hydride and thereby effect reduction of the lanthanum constituent to form lanthanum metal. The resulting mixture is heated in a non-reactive atmosphere to diffuse the lanthanum metal into the nickel particles to form the nickel-lanthanum alloy. The alloy-containing mixture is then treated to recover the particles of alloy.

Nickel-lanthanum alloys exist in a variety of phases. It is the $Ni_5La$ phase which is highly useful for the selective absorption and storage of hydrogen. In the present process a nickel-lanthanum alloy having a composition within 15% by weight of the $Ni_5La$ stoichiometric composition is prepared. Such an alloy contains a substantial amount of the $Ni_5La$ single phase compound. Preferably, for best results, the alloy consists of the $Ni_5La$ single phase compound.

In the present process, it is actually calcium resulting from the decomposition of the calcium hydride which acts to reduce lanthanum oxide to form lanthanum metal. Hydrogen does not reduce lanthanum oxide to form lanthanum in any significant amount. Calcium hydride is used because it is brittle and pulverizable to form a thorough particulate mixture with lanthanum oxide so that it can act on the oxide effectively. In contrast to calcium hydride, calcium metal is ductile and cannot be formed into a powder to provide the necessary contact with the lanthanum oxide particles to reduce them satisfactorily. One particular advantage of the use of calcium hydride in the present process is that calcium does not alloy with the nickel-lanthanum alloy.

Another advantage of the present process is that the particle size of the nickel-lanthanum alloy produced is predeterminable because it is nearly the same as the particle size of the nickel particles initially used. Since nickel powder is presently commercially available in a wide range of particle sizes and size distributions, the present process is useful to produce the nickel-lanthanum alloy in a corresponding wide range of particle sizes and size distributions. This is in contrast to past processes where nickel-lanthanum alloy must be ground to particle size since grinding does not provide direct control over the actual particle size, or particle size distribution, and must be followed by a time-consuming screening procedure to recover particles of the desired size. Another advantage of the present process is that the particles of nickellanthanum alloy produced are substantially free of strain whereas the particles produced by grinding procedures of past processes are inherently strained.

Considering the process of this invention in more detail, the following equation represents the stoichiometric reaction for forming $Ni_5La$ by the reduction of the lanthanum from the oxide to a constituent of the nickel-lanthanum intermetallic compound:

$$5\ Ni + \tfrac{1}{2}\ La_2O_3 + 3/2\ CaH_2 \xrightarrow{heat} Ni_5La + 3/2\ CaO + 3/2\ H_2.$$

Substantially stoichiometric amounts of the active constituents, nickel, lanthanum oxide and calcium hydride, for preparing the nickel-lanthanum intermetallic compound or alloy are satisfactory in the present process. However, under certain operating conditions, an excess amount of lanthanum oxide may be used to cover any losses of lanthanum. In addition, preferably, an amount of calcium hydride in excess of the stoichiometric amount necessary to reduce lanthanum oxide is used so that the excess calcium hydride is converted to metallic calcium which precipitates at the boundaries of the particles of the resulting nickel-lanthanum intermetallic compound or alloy. The resulting product mass can then be placed in air or other oxygen and moisture-containing atmosphere to allow the precipitated calcium to oxidize or hydrolyze to disintegrate the mass and release the particles of nickel-lanthanum compound or alloy.

The lanthanum oxide can vary in particle size, and usually ranges from about 1 to about 10 microns. It is available in commerce generally as a powder having a size of about 1 micron. The smaller the particle size, the faster the oxide is reduced, and the resulting lanthanum metal is thereby made available for diffusion into the cobalt in a shorter period of time.

Nickel can be used in a wide range of particle size and is available commercially in such form. Since the size of the particles of nickel-lanthanum alloy is essentially the same as that of the particles of nickel used in forming it, the nickel particles preferably range in size from about 10 to 50 microns. Nickel particles of such size produce alloy particles coarse enough to inhibit significant oxidation and also provide sufficient surface area for the significant absorption of hydrogen. However, the coarser the nickel particles, the longer is the period of time required to carry out the diffusion to form the alloy.

Since the calcium hydride decomposes in the present process, it may vary widely in particle size and may be as coarse as 12 mesh or coarser. Generally, a pulverized powder is preferred so that an intimate mixture of the active constituents can be produced. Commercially available calcium hydride always contains some calcium oxide. This will not interfere with proper operation of the process so long as there is sufficient amount of calcium hydride to reduce the rare earth metal oxide as well as cobalt oxide if cobalt is introduced in that form. The necessary excess amount of commercial calcium hydride needed is determinable empirically.

A number of conventional techniques can be used to carry out the instant process. Preferably, the nickel, calcium hydride and lanthanum oxide are thoroughly mixed so that in carrying out the reaction, the calcium resulting from the decomposition of calcium hydride can act on the oxide effectively, and also, so that the resulting lanthanum metal can readily diffuse into the nickel particles. In grinding calcium hydride, if any grinding is required, and in handling the powder mixture, it is essential to use protective enclosures so that the atmosphere may be maintained completely free of moisture. While calcium hydride is substantially inert in completely dry air, the powder or dust is highly explosive under conditions where an electrostatic discharge might occur. Therefore, for safety considerations a protective atmosphere such as a nitrogen atmosphere is preferable to air for mixing and handling the powder. To prevent contamination, the loose powder mixture is preferably placed in a controlled atmosphere glove box. Alternatively, the loose powder can first be pressed into bricks to decrease the volume per unit weight of material, thereby increasing the furnace throughput.

As the mixture of active constituents is heated, the calcium hydride decomposes and the resulting calcium reduces the lanthanum oxide. Such heating should be carried out in an inert atmosphere such as, for example, argon or helium or a partial vacuum. It can also be carried out in an atmosphere of hydrogen since hydrogen is evolved at this time. In addition, since hydrogen gas is evolved, this heating can be carried out at atmospheric pressure. Specifically, at about atmospheric pressure when a temperature of about 850°C is attained, the reduction process begins as indicated by the evolution of hydrogen and it continues to evolve up to a temperature of about 1,000°C. Substantially all the lanthanum oxide is reduced under these conditions. To carry out the diffusion of the resulting lanthanum metal, heating is then continued in hydrogen or an inert atmosphere such as, for example, argon or helium or a partial vacuum. Specifically, to carry out the diffusion, heating is maintained long enough at a temperature which allows the resulting lanthanum metal to diffuse into the nickel particles to form the alloy. This diffusion heating period and the diffusion heating temperature depend largely on the size of the nickel particles. This is determinable empirically. For example, for nickel powder having a particle size of 10 - 20 microns, about 2 hours in a substantial vacuum at a temperature of 1050° - 1,100°C is sufficient to accomplish the lanthanum diffusion. Coarser nickel particles require correspondingly longer diffusion heating periods or higher diffusion temperatures.

The product of the present invention can be cooled in an inert atmosphere such as helium, argon or hydrogen or in a vacuum. Where a substantially stoichiometric amounts of calcium hydride is used, the product is generally a fused cake which requires grinding to form a flowable material. Where excess calcium hydride is used, however, the precipitated metallic calcium, which is allowed to oxidize or hydrolize will generally disintegrate in excess of 90% of the product to a flowable particulate material. Some minor amount of grinding might be necessary to completely disintegrate the product or produce it in a finer form.

To recover the particles of nickel-lanthanum alloy, a variety of separation techniques can be employed. In one technique, water is added to the particulate product to convert the calcium oxide to calcium hydroxide and to remove calcium hydroxide which is a flocculent precipitate that can be effectively decanted off with repeated washings with water. A preferred final cleanup treatment comprises admixing dilute acetic acid with the recovered alloy particles to leach away traces of remaining calcium hydroxide. The nickel-lanthanum alloy particles can then be rinsed with water and dried in a conventional manner.

It has been found that some calcium always remains entrapped with the alloy particles and cannot be removed without melting the alloy particles. This calcium may be in the form of elemental calcium and/or calcium oxide. Such calcium is determinable by standard chemical analysis and usually ranges from a detectable amount to about 0.4% by weight of the nickel-lanthanum alloy.

In the present process, if desired, the calcium hydride can be formed in situ by a number of methods. One method comprises admixing calcium metal with lanthanum oxide and cobalt and heating the mixture in the presence of hydrogen to form the calcium hydride, and the mixture is then preferably reground to produce a thorough blend. Once the calcium hydride is formed in situ, the process then can proceed in the same manner as if calcium hydride had been added initially.

In one embodiment of the present invention, the lanthanum oxide is initially admixed with calcium hydride and heated to affect reduction of the lanthanum constituent. The stoichiometric reaction for this embodiment is as follows:

$$La_2O_3 + 3CaH_2 \xrightarrow{\Delta} 2La + 3CaO + 3H_2.$$

The resulting cake mixture can be ground and then admixed with nickel particles and heated to diffuse the lanthanum into the nickel particles to form the alloy which can then be separated from the calcium oxide as already disclosed.

In another embodiment of the present process, nickel oxide instead of metallic nickel is initially mixed with lanthanum oxide alone and the mixture is heated in hydrogen or other reducing atmosphere to reduce the nickel oxide to metallic nickel. The reaction is as follows:

$$NiO \text{ (dispersed in lanthanum oxide)} + H_2 \xrightarrow{\Delta}$$

$$Ni \text{ (dispersed in lanthanum oxide)} + H_2O.$$

The resulting mixture is admixed with particulate calcium hydride and then heated, as disclosed, to carry out the reduction of lanthanum oxide and the diffusion of the resulting lanthanum metal into the nickel.

All parts and percentages used herein are by weight unless otherwise noted and where screen size is referred to, it is the U.S. Standard Screen Size.

The invention is further illustrated by the following example where all heating was carried out in an electric hydrogen furnace, i.e. a furnace provided with a hydrogen atmosphere.

EXAMPLE

In this example, the formulation was as follows:
58.71 grams of Nickel powder(−400 mesh, i.e., −38 microns)
32.58 grams of $La_2O_3$ (1.1 microns)
17.68 grams of Calcium Hydride (−40 mesh).

The nickel powder and lanthanum oxide were mixed together in a jar mill for 15 hours to produce a thoroughly blended mixture. Calcium hydride was then added to the mixture which was then tumbled for an additional 10 minutes under a nitrogen atmosphere in a dry box. The mixture was poured into a nickel container which was then placed in an electric hydrogen furnace and heated to a temperature of about 850°C where it was maintained for 2 hours to reduce the lanthanum oxide. It was then heated rapidly in a period of 35 minutes to 1,050°C at which temperature it was held for 2 hours to carry out the diffusion of the lanthanum into the nickel powder. The product was then placed in the cold chamber of the hydrogen furnace where it cooled to room temperature in hydrogen. The resulting reacted cake was placed in a hydrator, i.e. a high humidity chamber, over the weekend. The cake broke into a flowable particulate material due to the hydration of excess metallic calcium. The calcium hydroxide in the resulting powder was then removed by repeated washes in water and by a final wash with dilute acetic acid. The powder was then washed with alcohol, and dried under vacuum. The powder particles had a size of about 7.2 microns. A portion of the dried product was subjected to X-ray diffraction analysis using the Debye-Scherrer technique. The X-ray powder pattern obtained indicated that it was practically single phase $Ni_5La$. Two extremely weak extra lines could not be accounted for as either the $Ni_7La$ or $Ni_{17}La_2$ compound. Standard chemical analysis of this product powder showed it to contain calcium in an amount of 0.38% by weight of the intermetallic compound.

What I claim as new and desire to secure by Letters Patent of the United States is:

1. In the process for storing hydrogen in particles of nickellanthanum alloy ranging in size from about 10 microns to 50 microns by contacting the particles with hydrogen gas which is selectively absorbed by said particles, said alloy consisting essentially of a composition within 15% by weight of the stoichiometric composition of the $Ni_5La$ intermetallic compound, the improvement comprising forming said alloy particles by providing a particulate mixture of lanthanum oxide, calcium hydride and nickel, said calcium hydride being used in an amount in excess of the stoichiometric amount necessary to reduce lanthanum oxide, heating said particulate mixture in a non-reactive atmosphere to decompose said calcium hydride and thereby effect reduction of said lanthanum constituent, then heating the resulting mixture in a non-reactive atmosphere to diffuse the resulting lanthanum metal into said nickel particles to form said alloy, leaving the resulting alloy-containing mixture in an oxidizing or moisture-containing atmosphere to oxidize or hydrolyze the excess calcium precipitated therein causing said mixture to disintegrate, and recovering said nickel-lanthanum alloy particles.

* * * * *